United States Patent [19]
Aldrich

[11] 3,774,935
[45] Nov. 27, 1973

[54] PITCH SUPPRESSING SYSTEM

[75] Inventor: Fredric C. Aldrich, Lansing, Mich.

[73] Assignee: General Motors Corporation, Detroit, Mich.

[22] Filed: June 8, 1972

[21] Appl. No.: 261,032

[52] U.S. Cl. ............................ 280/124 F, 188/313
[51] Int. Cl. ............................................ B60g 23/00
[58] Field of Search ................... 280/124 R, 124 F; 188/313, 318

[56] References Cited
UNITED STATES PATENTS

| | | | |
|---|---|---|---|
| 3,537,715 | 11/1970 | Gualdoni | 280/124 R |
| 3,176,801 | 4/1965 | Huff | 188/313 |
| 1,117,057 | 11/1914 | Kohner | 188/313 |
| 2,553,912 | 5/1951 | Gervais | 188/313 |

*Primary Examiner*—Philip Goodman
*Assistant Examiner*—John A. Carroll
*Attorney*—Warren E. Finken et al.

[57] ABSTRACT

A system for suppressing forward pitching of the sprung mass portion of a vehicle during braking maneuvers, the system including a cylinder connected to the vehicle sprung mass, a rod connected to the unsprung mass and having a piston thereon slidable within the cylinder, a conduit between the chambers of the cylinder defined by the piston, a working fluid in the chambers and the conduit, an electrically actuated valve in the conduit for blocking the latter, and a switch responsive to operation of the vehicles's service brake for actuating the valve, the valve being operative when actuated by the switch to prevent fluid flow through the conduit between the chambers thereby to lock the cylinder and rod for suppressing relative movement between the sprung and the unsprung mass portions.

1 Claim, 1 Drawing Figure

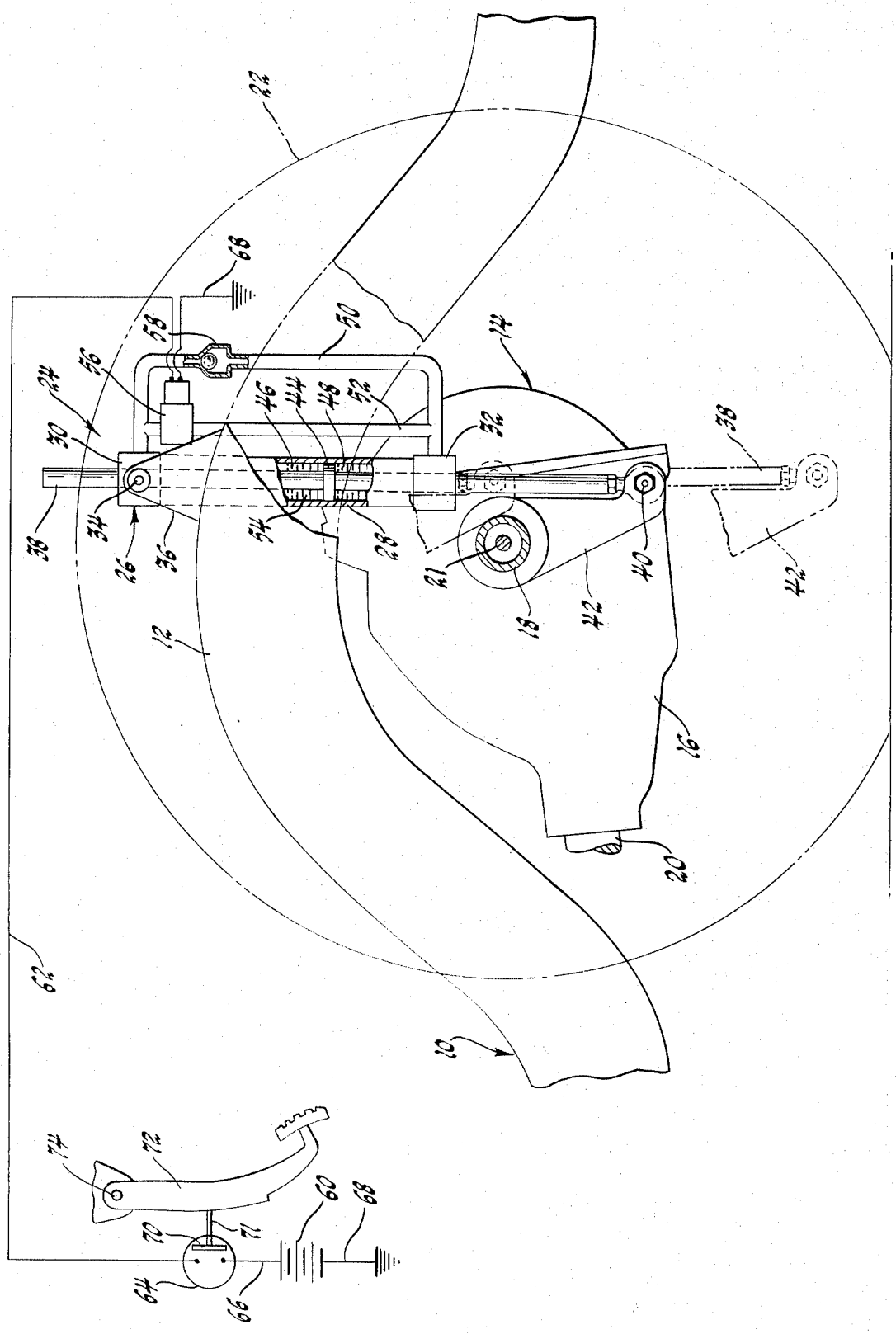

PITCH SUPPRESSING SYSTEM

This invention relates generally to vehicle suspension arrangements and more particularly to a system for suppressing vehicle pitch during braking.

The primary feature of this invention is that it provides an improved pitch suppressing system adapted particularly for incorporation in the rear suspension system of an automobile type vehicle to suppress the forward pitch of the latter typically associated with vehicle braking maneuvers. Another feature of this invention is that it provides an improved vehicle pitch suppressing system including an electrically actuatable locking unit disposed between the sprung and the unsprung mass portions of the vehicle and a switch for actuating the locking unit to a locked condition wherein relative jounce and rebound deflection between the sprung and unsprung mass portions is prevented, the switch being controlled by the vehicle brake pedal so that the locking unit is actuated to the locked condition whenever the brake is applied. Yet another feature of this invention resides in the provision of a locking unit including a cylinder connected to the sprung mass portion of the vehicle, a rod extending through the cylinder and connected to the unsprung mass portion of the vehicle, a piston on the rod dividing the cylinder into a pair of variable volume chambers, and a conduit with an electrically actuatable valve therein disposed between the variable volume chambers, the chambers and the conduit being filled with an incompressible working fluid which is normally pumped by the piston between the chambers but which locks the piston relative to the cylinder when the conduit is blocked by the valve member electrically actuated in response to application of the vehicle's service brake. A still further feature of this invention resides in the provision in the locking unit of a parallel path conduit providing communication between the variable volume chambers, independently of the first mentioned conduit, the parallel path conduit having a check valve therein adapted, depending upon the location of the locking unit, to permit one mode of deflection while automatically preventing the other.

The foregoing and other features of this invention will be readily apparent from the following specification and from the single drawing FIGURE showing the pitch suppressing system according to this invention in an automobile suspension system enviroment.

Referring now to the single drawing FIGURE, there-shown is partially broken away side elevation is a portion of an automobile type vehicle including a longitudinally extended frame rail 10. The rail 10 is one of a pair of identical, transversely spaced, and rigidly interconnected rails which form the frame of the vehicle. The rail 10 includes, toward the rear end thereof, an arched portion 12 which extends above a transversely oriented rear axle assembly 14. The rear axle assembly includes a conventional differential carrier 16 situated generally in the longitudinal plane of the symmetry of the vehicle between the frame rails. The axle assembly further includes a pair of axle tubes rigidly attached to the carrier and extending transversely from opposite sides of the latter, only axle tube 18 being shown in the FIGURE. The axle tubes rotatably support therewithin respective ones of a pair of axle shafts driven, through conventional gearing within the differential carrier 16, by a drive shaft 20 extending between the transmission of the vehicle, not shown, and the differential carrier, only axle shaft 21 being shown in the FIGURE. A pair of rear wheels are rotatably disposed at the outboard ends of the axle tubes and are conventionally driven by corresponding ones of the axle shafts, only one rear wheel 22 being shown in broken lines in the FIGURE.

As in conventional, the rear wheels and the rear axle assembly 14 constitute a part of the unsprung mass portion of the vehicle while the frame, including the rail 10, constitutes a part of the sprung mass portion of the vehicle, the sprung mass portion being supported above the unsprung mass portion by conventional spring means, not shown, disposed therebetween. Accordingly, forces on the unsprung mass portion resulting from road irregularities initiate relative jounce deflection between the mass portions wherein the rear axle assembly 14 approaches the rail 10 or relative rebound deflection between the mass portions wherein the rear axle assembly moves away from the rail 10. Further, when the service brake system of the vehicle is actuated to decelerate the latter, forward pitching of the vehicle typically results because the center of gravity of the vehicle is situated a substantial distance above the road. Such forward pitching causes the front of the vehicle to dip and the rear to lift thus initiating relative rebound reflection between the rail 10 and the rear axle assembly. To control this forward pitching during vehicle braking maneuvers, a pitch suppressing system according to this invention and designated generally 24 is provided.

The pitch suppressing system 24 includes a locking unit 26 disposed between the rear axle assembly 14 and the rail 10, it being understood that an identical locking unit, not shown, is disposed between the second frame rail and the rear axle assembly on the opposite side of the vehicle. The locking unit 26 includes a cylinder 28 sealingly closed at its opposite ends by a pair of cap members 30 and 32. The cylinder is oriented generally vertically and extends through an appropriate opening in the frame rail 10 and is pivotably connected to the latter at 34 through a pair of lugs rigidly attached to the rail, only one lug 36 being shown. A rod 38 is slidingly and sealingly supported in aligned apertures in respective ones of the cap members 30 and 32 and extends along the longitudinal axis of the cylinder. The lower end of the rod 38 is pivotably connected at 40 to a bracket 42 rigidly attached, as by welding, to the axle tube 18. Accordingly, each relative jounce and rebound deflection between the rail 10 and the rear axle assembly effects sliding movement of the rod relative to the cylinder 28, the rod being of sufficient length to remain in sealing engagement with each of the cap members 30 and 32 throughout the range of relative movement between the rail 10 and the rear axle assembly.

The locking unit 26 further includes a piston 44 rigidly attached to the rod 38 within the cylinder 28. The piston slidingly and sealingly engages the inside diameter of the cylinder thereby to divide the latter into a pair of unconnected variable volume chambers 46 and 48. The chambers are, however, interconnected independently of the piston 44 through a c-shaped conduit 50 extending between the cap member 30 and 32. The chambers are further interconnected independently of the piston 44 by a parallel path conduit 52 extending between opposite leg portions of the conduit 50.

The variable volume chambers 46 and 48, as well as the conduits 50 and 52, are completely filled with an incompressible working fluid 54 such as ordinary hydraulic brake fluid. Accordingly, as the rail 10 and the rear axle assembly 14 experience relative jounce and rebound deflections the piston 44 pumps the working fluid 54 between the variable volume chambers through the conduits 50 and 52.

The conduit 52 has disposed therein a valve member 56 which is electrically actuatable between an open condition permitting unimpeded fluid flow in the conduit and a closed condition completely terminating such flow. The conduit 50 has disposed therein a check valve 58 adapted to permit fluid flow between the variable volume chambers during relative jounce deflection between the rail 10 and the rear axle assembly and to terminate such flow during relative rebound deflection between the rail and the rear axle assembly.

An electrical circuit is provided for actuating the valve member 56 and includes a source of electrical potential 60 which may be the storage battery of the vehicle. The circuit further includes a conductor 62 extending between an electrical terminal of the valve member 56 and one terminal of a normally open switch 64, a conductor 66 extending between the source 60 and the other terminal of the switch 64, and a pair of ground conductors 68 electrically grounding the source 60 and the valve member 56. The switch 64 includes a contactor portion 70 movable between an operative position, not shown, electrically connecting the conductors 62 and 66 and an inoperative position, as shown, remote from the conductors. The contactor 70 is connected by a link 71 to a foot pedal 72 pivotally supported at 74 on a portion of the vehicle body. The foot pedal is also connected by conventional means, not shown, to the service brake system of the vehicle so that pivotal movement of the pedal 72 simultaneously effects actuation of the service brake system and connection between the conductors 62 and 66.

Describing now the operation of the pitch suppressing system 24, during normal vehicle operation when braking maneuvers are not required the transient relative jounce and rebound deflections between the rail 10 and the rear axle assembly 14 effect flow of the working fluid back and forth between the chambers 46 and 48. Depending upon the size of the conduits, there may be or may not be, as desired, throttling of the working fluid to effect energy absorption. When, however, a braking maneuver is required the operator depresses the pedal 72 to actuate the service brake system. Simultaneously, the conductor 66 is electrically connected to the conductor 62 through the contactor 70 thus completing a circuit from the source 60 through the valve member 56 to ground. The valve member 56 is thereby actuated from the open condition to the closed condition terminating communication between the chambers 46 and 48 through the conduit 50. Accordingly, since the check valve 58 prevents fluid flow through the conduit 50 in response to relative rebound deflection between the rail 10 and the rear axle assembly, the rod 38 is effectively locked relative to the cylinder 28 by the working fluid during rebound deflection because the fluid is prevented from flowing between the variable volume chambers by the valve member 56. With relative rebound deflection thus foreclosed, forward pitching of the vehicle is effectively suppressed.

It will, of course, be apparent to those skilled in the art that the check valve 58 continues to permit relative jounce deflection between the rail and the rear axle assembly during periods of braking thereby to maintain a smooth ride if a bump should be encountered. Further, it will be apparent that the locking unit 26 might be disposed between the frame and the front wheel unsprung mass portions of the vehicle with the check valve 58 reversed to permit only relative rebound deflection. Still further, each wheel of the vehicle might have associated therewith a locking unit 26. In any of these three installations, however, the result is identical in that a solid link is automatically disposed between the sprung and unsprung mass portions of the vehicle when the service brake is applied, the solid link effectively suppressing the tendency of the vehicle to pitch during braking maneuvers.

Having thus described the invention, what is claimed is:

1. In a vehicle including an unsprung mass portion, a sprung mass portion supported on said unsprung mass portion for jounce and rebound deflection relative to the latter, a service brake system, and a manually operable control member associated with said brake system for selectively actuating the latter to arrest traversing motion of said vehicle, the improvement comprising, a cylinder member connected to one of said sprung and said unsprung mass portions, a rod slidably disposed on said cylinder member and extending axially of said cylinder member and completely therethrough, means connecting said rod to the other of said sprung and said unsprung mass portion so that jounce and rebound deflections therebetween effects sliding movement of said rod relative to said cylinder member, a piston rigidly attached to said rod and slidably disposed within said cylinder member, said piston dividing said cylinder member into a pair of unconnected variable volume chambers adapted for alternate expansion and contraction in response to relative movement between said piston and said cylinder member, a first conduit remote from said piston for effecting communication between said variable volume chambers, a second conduit remote from said piston for effecting communication between said variable volume chambers, an incompressible working fluid disposed in said variable volume chambers and in each of said first and said second conduits, said working fluid being pumped between said chambers in parallel paths through said first and second conduits in response to movement of said piston relative to said cylinder member, electrically operable valve means disposed in said first conduit and actuable between an open condition and a closed condition terminating communication between said variable volume chambers through said first conduit, a source of electrical potential, circuit means between said source and said valve means including a switch responsive to operation of said control member for effecting actuation of said valve means to the closed condition thereof when said brake system is actuated, and a check valve disposed in said second conduit for permitting flow of said working fluid between said variable volume chambers independently of said first conduit during deflection between said sprung and said unsprung mass portion in one of the jounce and rebound modes and for preventing such flow through said second conduit during deflection between said sprung and said unsprung mass portion in the other of the jounce and rebound modes.

* * * * *